United States Patent
Jen et al.

(10) Patent No.: US 11,619,776 B2
(45) Date of Patent: Apr. 4, 2023

(54) LIGHT GUIDE ASSEMBLY AND REFLECTIVE DISPLAY DEVICE

(71) Applicant: E Ink Holdings Inc., Hsinchu (TW)

(72) Inventors: Hsin-Hao Jen, Hsinchu (TW);
Tsai-Wei Shei, Hsinchu (TW);
Chin-Chi Yu, Hsinchu (TW);
Chih-Chun Chen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 584 days.

(21) Appl. No.: 16/676,420

(22) Filed: Nov. 6, 2019

(65) Prior Publication Data
US 2020/0192021 A1    Jun. 18, 2020

(30) Foreign Application Priority Data
Dec. 12, 2018    (TW) .................. 107144849

(51) Int. Cl.
*G02B 6/00*  (2006.01)
*F21V 8/00*  (2006.01)
*G02F 1/16757*  (2019.01)
*G02F 1/167*  (2019.01)
*G02F 1/1677*  (2019.01)

(52) U.S. Cl.
CPC ......... *G02B 6/0088* (2013.01); *G02B 6/0091* (2013.01); *G02F 1/167* (2013.01); *G02F 1/1677* (2019.01); *G02F 1/16757* (2019.01)

(58) Field of Classification Search
CPC .. G02B 6/0055; G02B 6/0068; G02B 6/0088; G02B 6/0091; G02F 1/167; G02F 1/16757; G02F 1/1677
See application file for complete search history.

(56) References Cited

U.S. PATENT DOCUMENTS

| | | | |
|---|---|---|---|
| 5,224,198 A * | 6/1993 | Jachimowicz | ........... G02C 9/00 359/13 |
| 7,223,008 B2 | 5/2007 | Henriet et al. | |
| 7,223,009 B2 | 5/2007 | Henriet et al. | |
| 8,282,258 B2 | 10/2012 | Ye et al. | |
| 8,746,909 B2 | 6/2014 | Chen et al. | |
| 8,833,959 B2 | 9/2014 | Lee et al. | |
| 10,203,443 B2 | 2/2019 | Chang et al. | |
| 2011/0157517 A1 | 6/2011 | Mouri | |

(Continued)

FOREIGN PATENT DOCUMENTS

| | | |
|---|---|---|
| CN | 1692292 A | 11/2005 |
| CN | 102252234 A | 11/2011 |

(Continued)

OTHER PUBLICATIONS

Corresponding Taiwan office action dated Jul. 29, 2019.
Corresponding Chinese office action dated Jun. 8, 2022.

*Primary Examiner* — Joseph P Martinez
*Assistant Examiner* — Vipin Patel
(74) *Attorney, Agent, or Firm* — CKC & Partners Co., LLC

(57) ABSTRACT

A light guide assembly includes a light guide plate and a light source. The light guide plate has a through hole, an inner sidewall that surrounds the through hole, and an outer sidewall that surrounds the inner sidewall. The inner sidewall has a halo elimination structure that faces the through hole. The outer sidewall has a light incident surface. The light source faces the light incident surface of the outer sidewall of the light guide plate.

13 Claims, 6 Drawing Sheets

(56) References Cited

U.S. PATENT DOCUMENTS

| | | | |
|---|---|---|---|
| 2011/0255029 A1 | 10/2011 | Kubota et al. | |
| 2014/0239326 A1 | 8/2014 | Perng | |
| 2017/0123140 A1* | 5/2017 | Han | G02B 6/0051 |
| 2017/0227703 A1* | 8/2017 | Montgomery | G02B 6/008 |

FOREIGN PATENT DOCUMENTS

| | | |
|---|---|---|
| CN | 104832884 A | 8/2015 |
| CN | 108027116 A | 5/2018 |
| CN | 108826103 A | 11/2018 |
| CN | 108957621 A | 12/2018 |
| TW | 200632603 A | 9/2006 |
| TW | 201326685 A | 7/2013 |
| TW | M482759 U | 7/2014 |
| TW | I631396 B | 8/2018 |
| TW | M565315 U | 8/2018 |
| TW | 201908830 A | 3/2019 |

* cited by examiner

LIGHT GUIDE ASSEMBLY AND REFLECTIVE DISPLAY DEVICE

RELATED APPLICATIONS

This application claims priority to Taiwan Application Serial Number 107144849, filed Dec. 12, 2018, which is herein incorporated by reference.

BACKGROUND

Field of Invention

The present invention relates to a light guide assembly and a reflective display device having the light guide assembly.

Description of Related Art

In the current market of various consumer electronic products, electronic products have extensively utilized reflective display devices as display screens, such as electronic paper display devices. In general, an electronic paper display device has a front panel laminate (FPL) and a thin-film transistor (TFT) array substrate.

In an electronic paper display device, white and black charged particles in the display medium layer may be driven to move by applying a voltage to the display medium layer of the front panel laminate, such that each pixel displays a black color, a white color or a gray level. Since the electronic paper display device utilizes incident light that irradiates the display medium layer to achieve the purpose of display, the electronic paper display device needs no backlight, which reduces power consumption.

Moreover, in order to let users to conveniently use the electronic paper display device in a dark environment, a front light module may be disposed above the front panel laminate to irradiate the display medium layer. However, reflected and scattered light may be formed in the light guide plate due to a light guide plate/air interface of the front light module. If the light guide plate has a through hole, a halo is easily formed adjacent to the through hole, thereby affecting display quality.

SUMMARY

An aspect of the present invention is to provide a light guide assembly.

According to an embodiment of the present invention, a light guide assembly includes a light guide plate and a light source. The light guide plate has a through hole, an inner sidewall that surrounds the through hole, and an outer sidewall that surrounds the inner sidewall. The inner sidewall has a halo elimination structure that faces the through hole. The outer sidewall has a light incident surface. The light source faces the light incident surface of the outer sidewall of the light guide plate.

In one embodiment of the present invention, the halo elimination structure is a light absorption layer.

In one embodiment of the present invention, the light absorption layer is dark ink, a dark adhesive tape, or a dark member.

In one embodiment of the present invention, the light absorption layer is in contact with the inner sidewall of the light guide plate.

In one embodiment of the present invention, the halo elimination structure is a microstructure.

In one embodiment of the present invention, the microstructure has a shape including zig-zag, curve, or a combination thereof.

In one embodiment of the present invention, the microstructure and the light guide plate are integrally formed as a single piece.

An aspect of the present invention is to provide a reflective display device.

According to an embodiment of the present invention, a reflective display device includes a thin-film transistor (TFT) array substrate, a front panel laminate, and a light guide assembly. The front panel laminate is on the TFT array substrate, and has a light transmissive film and a display medium layer. The display medium layer is between the light transmissive film and the TFT array substrate. The light guide assembly is on the front panel laminate, and includes a light guide plate and a light source. The light guide plate has a through hole, an inner sidewall that surrounds the through hole, and an outer sidewall that surrounds the inner sidewall. The inner sidewall has a halo elimination structure that faces the through hole, and the outer sidewall has a light incident surface. The light source faces the light incident surface of the outer sidewall of the light guide plate.

In one embodiment of the present invention, the halo elimination structure is a light absorption layer.

In one embodiment of the present invention, the light absorption layer is dark ink, a dark adhesive tape, or a dark member.

In one embodiment of the present invention, the light absorption layer is in contact with the inner sidewall of the light guide plate.

In one embodiment of the present invention, the halo elimination structure is a microstructure.

In one embodiment of the present invention, the microstructure has a shape including zig-zag, curve, or a combination thereof.

In one embodiment of the present invention, the microstructure and the light guide plate are integrally formed as a single piece.

In the aforementioned embodiments of the present invention, because the inner sidewall of the light guide plate of the light guide assembly has the halo elimination structure facing the through hole, after light of the light source enter the light guide plate from the light incident surface of the outer sidewall of the light guide plate, reflected and scattered light formed by a light guide plate/air interface can be absorbed by the halo elimination structure or can be uniformed by the halo elimination structure through scattering. As a result, such a design can prevent the light guide assembly from forming a halo adjacent to the through hole of the light guide plate, thereby improving display quality.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
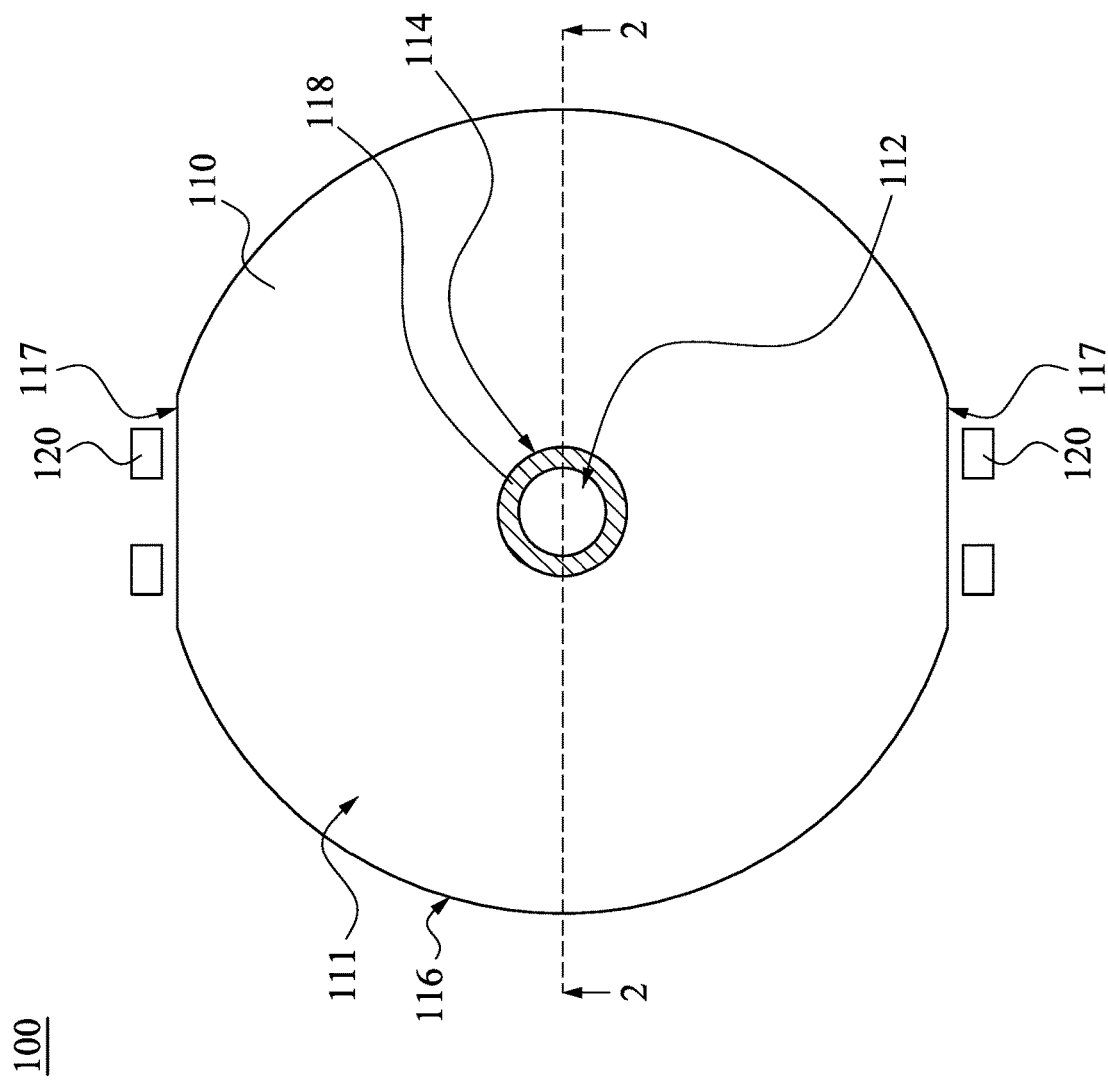
FIG. 1 is a top view of a light guide assembly according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
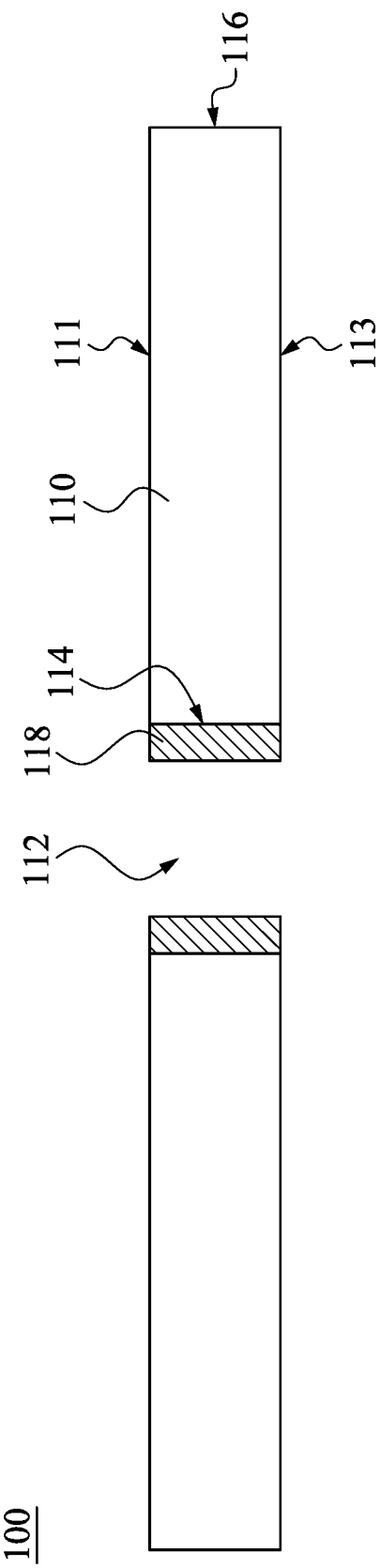
FIG. 2 is a cross-sectional view of a light guide plate taken along line 2-2 shown in FIG. 1.

FIG. 1 is a top view of a light guide assembly 100 according to one embodiment of the present invention. FIG. 2 is a cross-sectional view of a light guide plate 110 taken along line 2-2 shown in FIG. 1. As shown in FIG. 1 and FIG. 2, the light guide assembly 100 includes the light guide plate 110 and a light source 120. The light guide plate 110 has a through hole 112, an inner sidewall 114 that surrounds the through hole 112, and an outer sidewall 116 that surrounds the inner sidewall 114. The outer sidewall 116 of the light guide plate 110 has a light incident surface 117. Furthermore, the light guide plate 110 has two opposite light emitting surfaces 111 and 113. The upper side and the lower side of the outer sidewall 116 are respectively adjacent to the light emitting surfaces 111 and 113, and the upper side and the lower side of the inner sidewall 114 are respectively adjacent to the light emitting surfaces 111 and 113. In other words, the inner sidewall 114 and the outer sidewall 116 are both located between the light emitting surfaces 111 and 113. The light source 120 faces the light incident surface 117 of the outer sidewall 116 of the light guide plate 110. For example, the light source 120 may be a light emitting diode (LED), but the present invention is not limited in this regard.

When the light source 120 emits light, the light may enter the light guide plate 110 from the light incident surface 117, and irradiate outward from the two light emitting surfaces 111 and 113. The light passing through the light emitting surface 113 may serve as incident light for a reflective display device (e.g., an electronic paper display device). Therefore, the light guide assembly 100 may act as a front light module of the reflective display device. Moreover, the through hole 112 of the light guide plate 110 may provide an assembly position for a rotating shaft of a hand, and thus the light guide assembly 100 may be used in products of reflective display devices including watches, clocks, etc., but the present invention is not limited in this regard.

The inner sidewall 114 of the light guide plate 110 has a halo elimination structure 118 that faces the through hole 112. In this embodiment, the halo elimination structure 118 is a light absorption layer. The light absorption layer 118 is capable of absorbing light. In this embodiment, the light absorption layer 118 may be dark ink, a dark adhesive tape, or a dark member, such as black ink, a black adhesive tape, or a black member, but the present invention is not limited in this regard. The light absorption layer 118 may attach to the inner sidewall 114 of the light guide plate 110. For example, the light absorption layer 118 is in direct contact with the inner sidewall 114 of the light guide plate 110.

Figure 3:
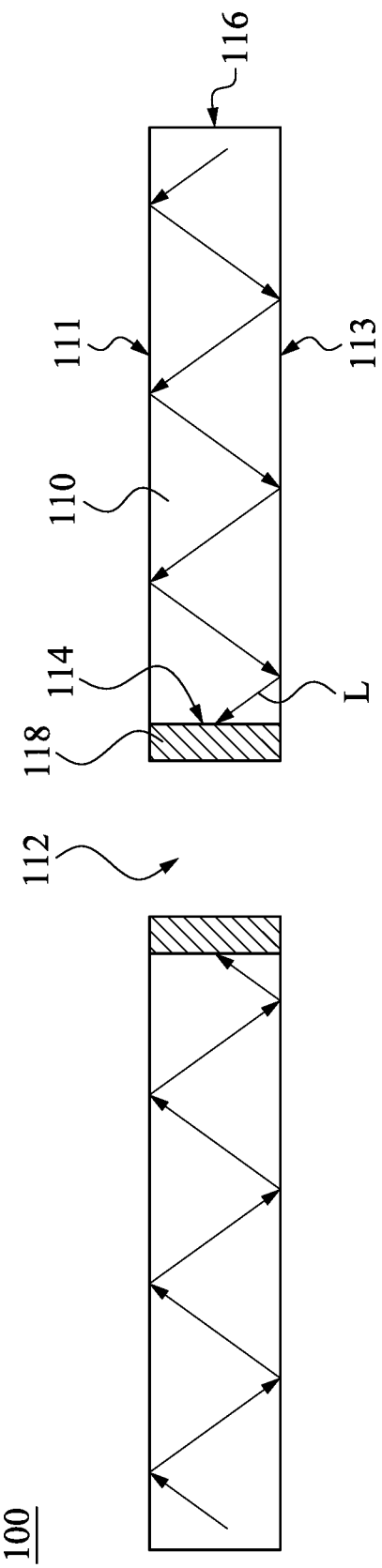
FIG. 3 is a schematic view of the light guide plate of FIG. 2 after receiving light of a light source.

FIG. 3 is a schematic view of the light guide plate 110 of FIG. 2 after receiving light of the light source 120 (see FIG. 1). As shown in FIG. 1 and FIG. 3, when the light source 120 emits the light, not only most of the light may irradiate outward from the light emitting surfaces 111 and 113 of the light guide plate 110 through refraction, but also reflected and scattered light are formed by the light guide plate 110/air interface (i.e., an interface between the light guide plate 110 and the air) and transmit in the light guide plate 110, such as the light L of FIG. 3.

Since the inner sidewall 114 of the light guide plate 110 of the light guide assembly 100 has the halo elimination structure 118 facing the through hole 112 and the halo elimination structure 118 is a light absorption layer, after light of the light source 120 enter the light guide plate 110 from the light incident surface 117 of the outer sidewall 116 of the light guide plate 110, reflected and scattered light (e.g., the light L) formed by the light guide plate 110/air interface can be absorbed by the halo elimination structure 118. As a result, such a design can prevent the light guide assembly 100 from forming a halo adjacent to the through hole 112 of the light guide plate 110, thereby improving display quality.

It is to be noted that the connection relationships and advantages of the elements described above will not be repeated in the following description. In the following description, a reflective display device having the light guide assembly 100 will be described.

Figure 4:
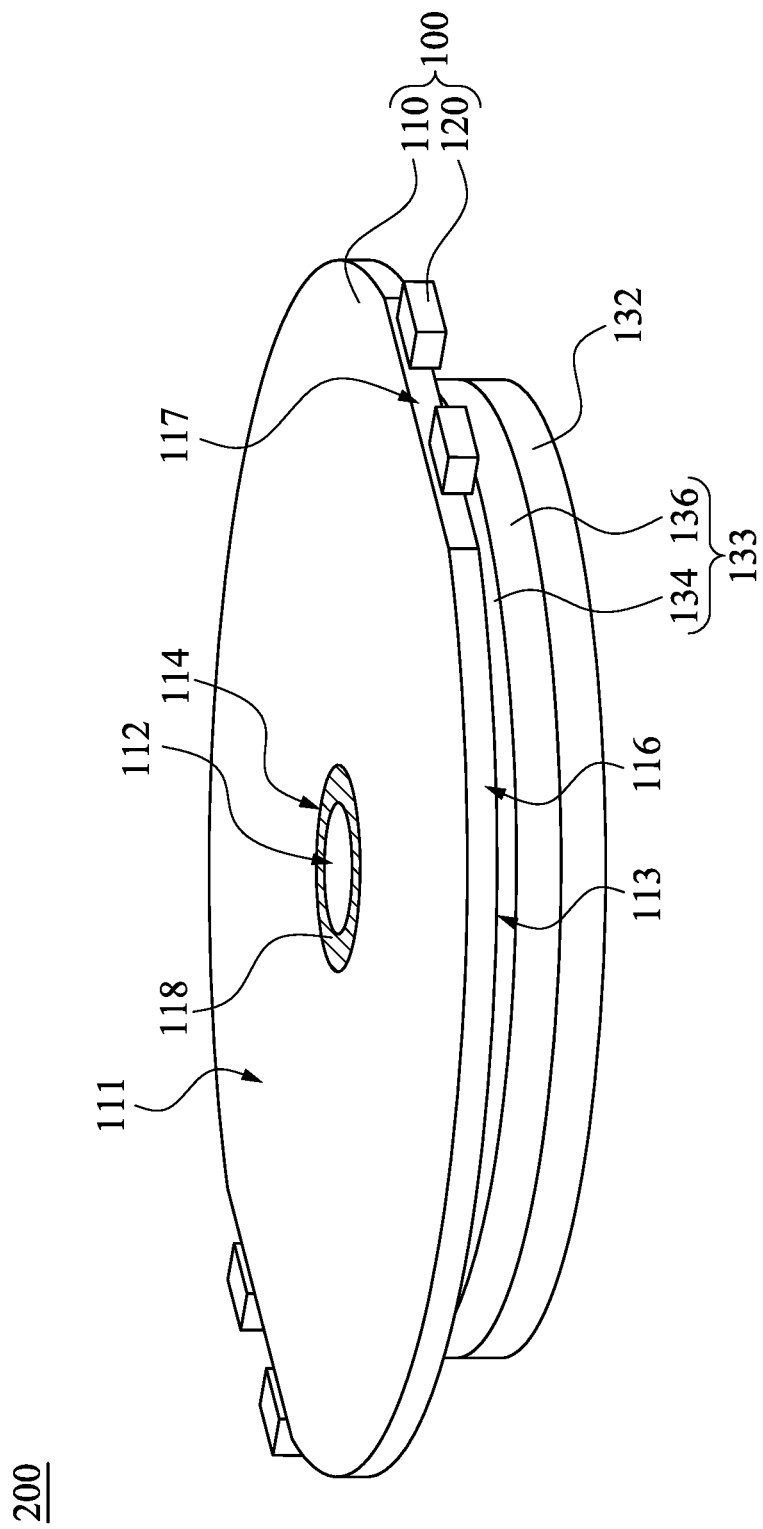
FIG. 4 is a perspective view of a reflective display device according to one embodiment of the present invention.

FIG. 4 is a perspective view of a reflective display device 200 according to one embodiment of the present invention. The reflective display device 200 includes a thin-film transistor (TFT) array substrate 132, a front panel laminate (FPL) 133, and the light guide assembly 100 of FIG. 1. The front panel laminate 133 has a light transmissive film 134 and a display medium layer 136. The display medium layer 136 is between the light transmissive film 134 and the TFT array substrate 132. The display medium layer 136 may include plural microcapsules having plural charged particles therein, such as black particles and white particles. The light guide assembly 100 is disposed on the front panel laminate 133.

When the light source 120 emits light, the light may enter the light guide plate 110 from the light incident surface 117, and irradiate outward from the two light emitting surfaces 111 and 113. The light passing through the light emitting surface 113 may serve as incident light for the front panel laminate 133. In this embodiment, the light guide assembly 100 may act as a front light module of the reflective display device 200. Moreover, the through hole 112 of the light guide plate 110 may provide an assembly position for a rotating shaft of a hand, and thus the reflective display device 200 may be used in products including watches, clocks, etc.

In the following description, other types of light guide assembly and reflective display device will be described.

Figure 5:
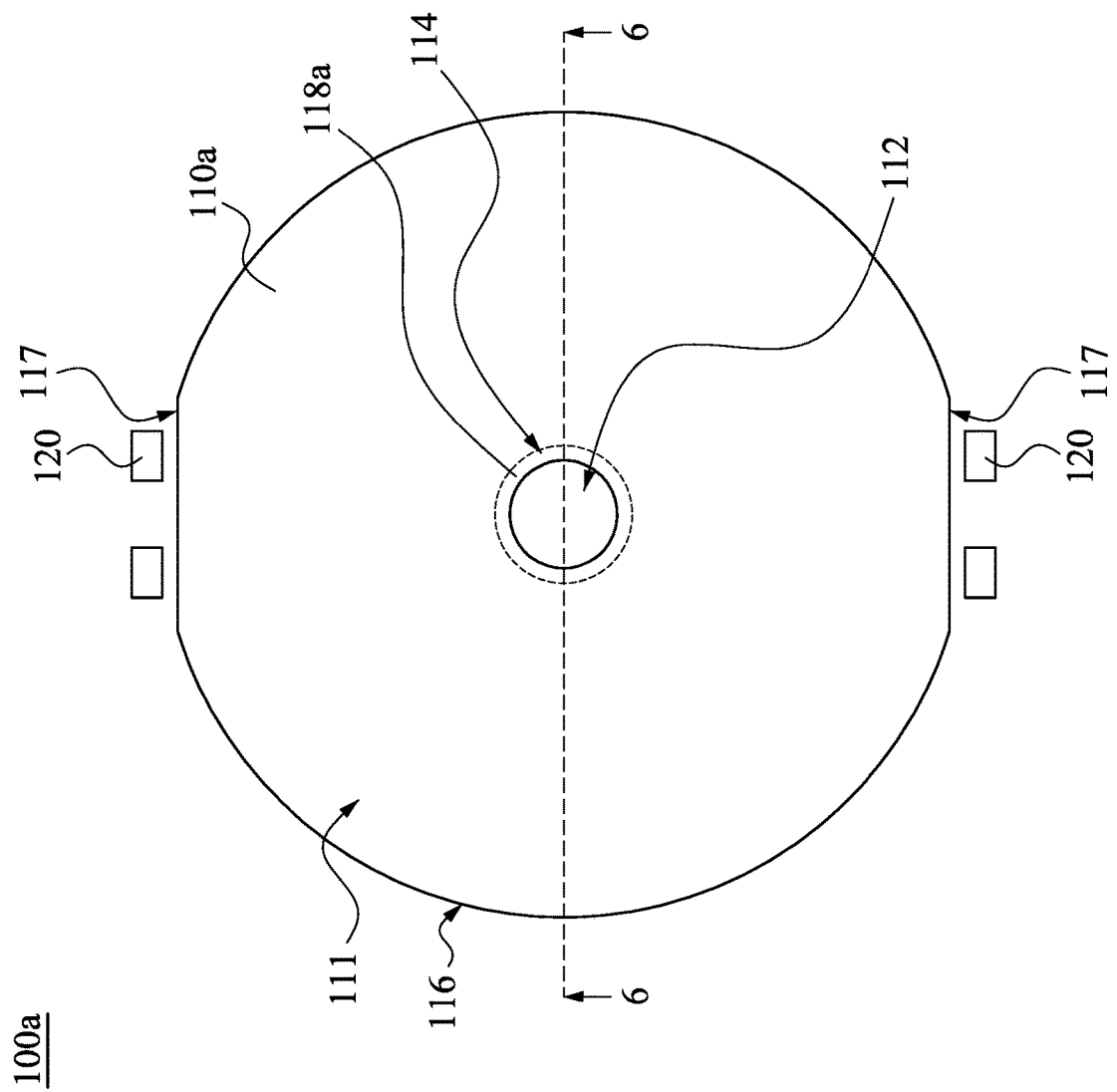
FIG. 5 is a top view of a light guide assembly according to one embodiment of the present invention.
Figure 6:
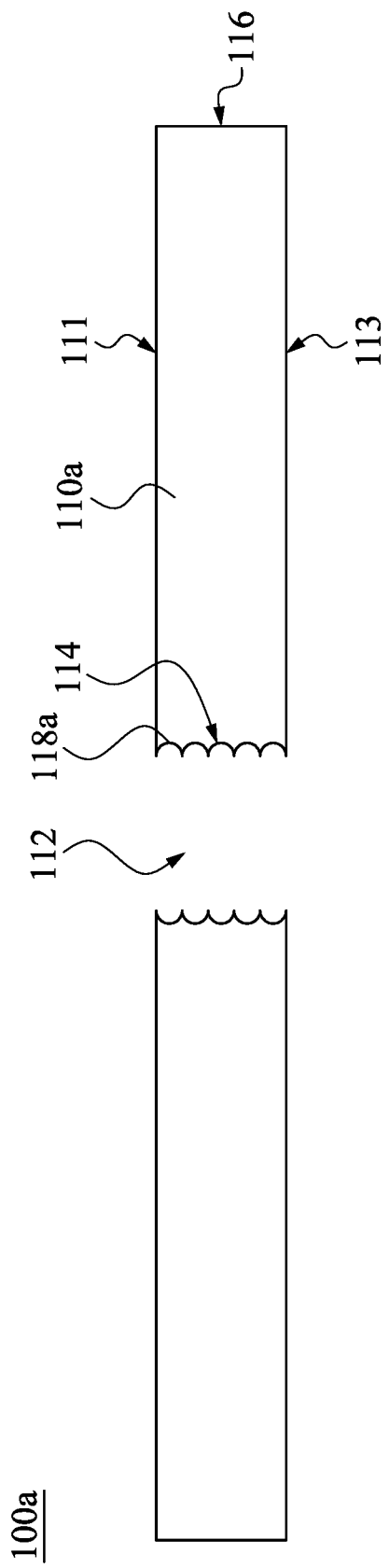
FIG. 6 is a cross-sectional view of a light guide plate taken along line 6-6 shown in FIG. 5.

FIG. 5 is a top view of a light guide assembly 100a according to one embodiment of the present invention. FIG. 6 is a cross-sectional view of a light guide plate 110a taken along line 6-6 shown in FIG. 5. As shown in FIG. 5 and FIG. 6, the light guide assembly 100a includes the light guide plate 110a and the light source 120. The light guide plate 110a has the through hole 112, the inner sidewall 114, and the outer sidewall 116. The light source 120 faces the light incident surface 117 of the outer sidewall 116 of the light guide plate 110a. The inner sidewall 114 of the light guide plate 110a has a halo elimination structure 118a that faces the through hole 112. The difference between this embodiment and the embodiment shown in FIGS. 1 and 2 is that the halo elimination structure 118a is a microstructure.

In this embodiment, the microstructure 118a has a curved shape, but the present invention is not limited in this regard. The microstructure 118a may has a shape including zig-zag, curve, or a combination thereof. In addition, the microstructure 118a and the light guide plate 110a may be integrally formed as a single piece, in which the microstructure 118a may be formed during the manufacture of the light guide plate 110a, but the present invention is not limited in this regard.

When the light source 120 emits light, the light may enter the light guide plate 110a from the light incident surface 117, and irradiate outward from the two light emitting surfaces 111 and 113. The light passing through the light emitting surface 113 may serve as incident light for a reflective display device (e.g., an electronic paper display device). Therefore, the light guide assembly 100a may act as a front light module of the reflective display device. Moreover, the through hole 112 of the light guide plate 110a may provide an assembly position for a rotating shaft of a hand, and thus the light guide assembly 100a may be used in products of reflective display devices including watches, clocks, etc., but the present invention is not limited in this regard.

Figure 7:
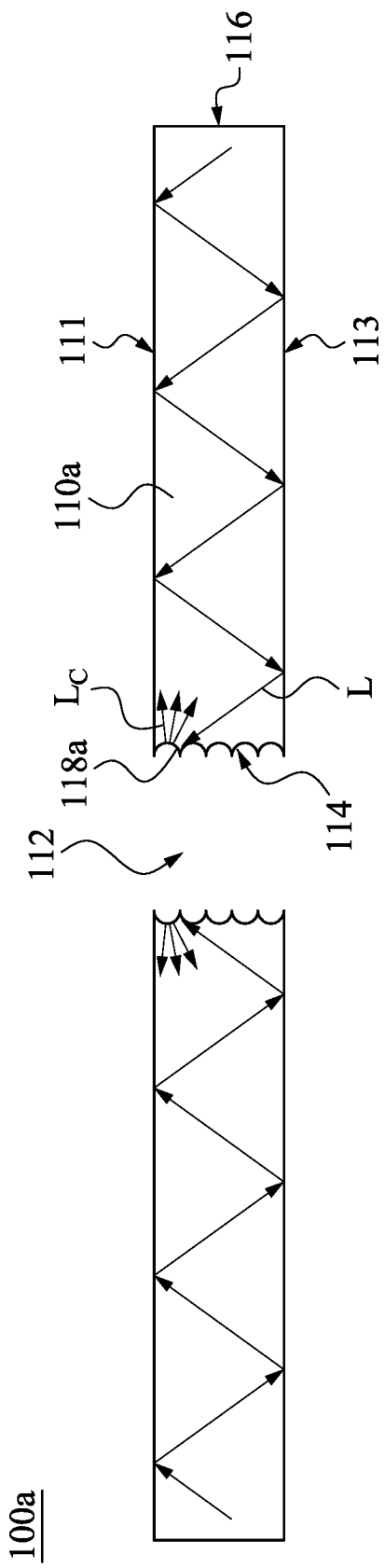
FIG. 7 is a schematic view of the light guide plate of FIG. 6 after receiving light of a light source.

FIG. 7 is a schematic view of the light guide plate 110a of FIG. 6 after receiving light of the light source 120 (see FIG. 5). As shown in FIG. 5 and FIG. 7, when the light source 120 emits the light, not only most of the light may irradiate outward from the light emitting surfaces 111 and 113 of the light guide plate 110a through refraction, but also reflected and scattered light are formed by the light guide plate 110a/air interface and transmit in the light guide plate 110a, such as the light L of FIG. 7.

Since the inner sidewall 114 of the light guide plate 110a of the light guide assembly 100a has the halo elimination structure 118a facing the through hole 112 and the halo elimination structure 118a is a microstructure, after light of the light source 120 enter the light guide plate 110a from the light incident surface 117 of the outer sidewall 116 of the light guide plate 110a, reflected and scattered light (e.g., the light L) formed by the light guide plate 110a/air interface can be uniformed by the halo elimination structure 118a through scattering to form light Lc. As a result, such a design can prevent the light guide assembly 100a from forming a halo adjacent to the through hole 112 of the light guide plate 110a, thereby improving display quality.

It is to be noted that the connection relationships and advantages of the elements described above will not be repeated in the following description. In the following description, a reflective display device having the light guide assembly 100a will be described.

Figure 8:
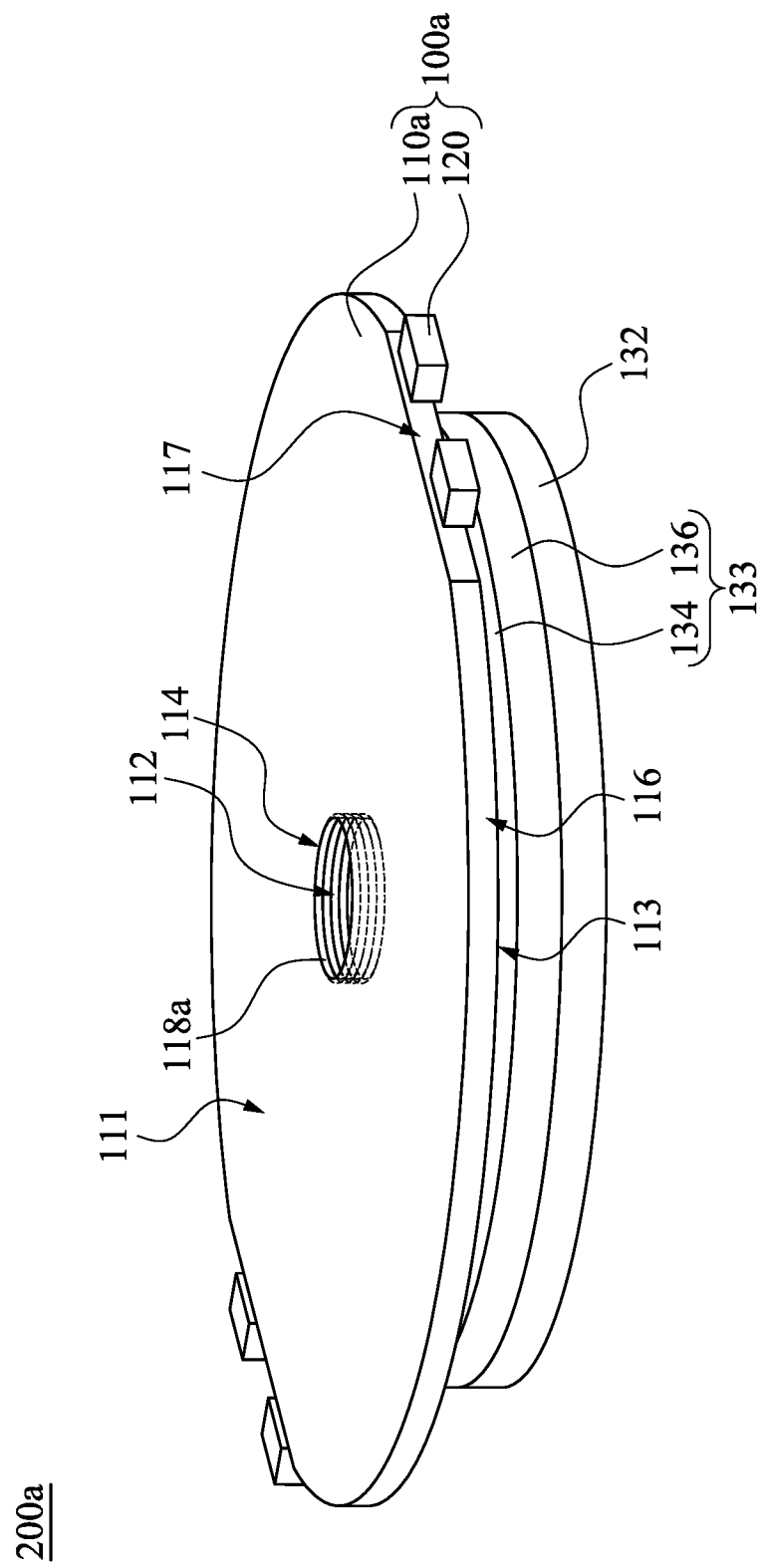
FIG. 8 is a perspective view of a reflective display device according to one embodiment of the present invention.

FIG. 8 is a perspective view of a reflective display device 200a according to one embodiment of the present invention. The reflective display device 200a includes the thin-film transistor (TFT) array substrate 132, the front panel laminate (FPL) 133, and the light guide assembly 100a of FIG. 5. The front panel laminate 133 has the light transmissive film 134 and the display medium layer 136. The display medium layer 136 is between the light transmissive film 134 and the TFT array substrate 132. The display medium layer 136 may include plural microcapsules having plural charged particles therein, such as black particles and white particles. The light guide assembly 100a is disposed on the front panel laminate 133.

When the light source 120 emits light, the light may enter the light guide plate 110a from the light incident surface 117, and irradiate outward from the two light emitting surfaces 111 and 113. The light passing through the light emitting surface 113 may serve as incident light for the front panel laminate 133. In this embodiment, the light guide assembly 100a may act as a front light module of the reflective display device 200a. Moreover, the through hole 112 of the light guide plate 110a may provide an assembly position for a rotating shaft of a hand, and thus the reflective display device 200a may be used in products including watches, clocks, etc.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims.

What is claimed is:

1. A light guide assembly, comprising:
    a light guide plate having a through hole, an inner sidewall that surrounds the through hole, and an outer sidewall that surrounds the inner sidewall, wherein the inner sidewall has a halo elimination structure that faces the through hole, the halo elimination structure is a light absorption layer, and the outer sidewall has two light incident surfaces, wherein the two light incident surfaces are located at opposite sides of the through hole; and
    a light source facing the two light incident surfaces of the outer sidewall of the light guide plate.

2. The light guide assembly of claim 1, wherein the light absorption layer is dark ink, a dark adhesive tape, or a dark member.

3. The light guide assembly of claim 1, wherein the light absorption layer is in contact with the inner sidewall of the light guide plate.

4. A light guide assembly, comprising:
    a light guide plate having a through hole, an inner sidewall that surrounds the through hole, and an outer sidewall that surrounds the inner sidewall, wherein the inner sidewall has a halo elimination structure that faces the through hole, the halo elimination structure is a microstructure, the outer sidewall has two light incident surfaces, wherein the two light incident surfaces are located at opposite sides of the through hole, and the microstructure is configured to scatter a first light entering from the two light incident surfaces and reflected towards the through hole to form a second light transmitting away from the through hole; and
    a light source facing the two light incident surfaces of the outer sidewall of the light guide plate.

5. The light guide assembly of claim 4, wherein the microstructure has a shape including zig-zag, curve, or a combination thereof.

6. The light guide assembly of claim 4, wherein the microstructure and the light guide plate are integrally formed as a single piece.

7. A reflective display device, comprising:
    a thin-film transistor (TFT) array substrate;
    a front panel laminate on the TFT array substrate, and having a light transmissive film and a display medium layer, wherein the display medium layer is between the light transmissive film and the TFT array substrate, and the display medium layer comprise a plurality of microcapsules; and a light guide assembly configured as a front light module, wherein the front panel laminate is located between the light guide assembly and the TFT array substrate and comprises:
  a light guide plate having a through hole, an inner sidewall that surrounds the through hole, and an outer sidewall that surrounds the inner sidewall, wherein the inner sidewall has a halo elimination structure that faces the through hole, and the outer sidewall has a light incident surface; and
  a light source facing the light incident surface of the outer sidewall of the light guide plate.

8. The reflective display device of claim 7, wherein the halo elimination structure is a light absorption layer.

9. The reflective display device of claim 8, wherein the light absorption layer is dark ink, a dark adhesive tape, or a dark member.

10. The reflective display device of claim 8, wherein the light absorption layer is in contact with the inner sidewall of the light guide plate.

11. The reflective display device of claim 7, wherein the halo elimination structure is a microstructure.

12. The reflective display device of claim 11, wherein the microstructure has a shape including zig-zag, curve, or a combination thereof.

13. The reflective display device of claim 11, wherein the microstructure and the light guide plate are integrally formed as a single piece.

\* \* \* \* \*